(12) United States Patent
Zhang et al.

(10) Patent No.: US 8,099,213 B2
(45) Date of Patent: Jan. 17, 2012

(54) ROAD-EDGE DETECTION

(75) Inventors: Wende Zhang, Shelby Township, MI (US); Varsha Sadekar, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 851 days.

(21) Appl. No.: 12/175,634

(22) Filed: Jul. 18, 2008

(65) Prior Publication Data

US 2010/0017060 A1    Jan. 21, 2010

(51) Int. Cl.
*G06K 9/00* (2006.01)
*G06K 9/78* (2006.01)
*E01F 9/06* (2006.01)

(52) U.S. Cl. ............ 701/41; 701/301; 382/104; 340/437

(58) Field of Classification Search .................... 701/41, 701/301; 382/103, 104, 106, 107, 108; 340/435, 340/436, 437; 356/4.01, 4.08
See application file for complete search history.

(56) References Cited

U.S. PATENT DOCUMENTS

| | | | |
|---|---|---|---|
| 5,675,489 A | 10/1997 | Pomerleau | |
| 7,106,886 B2 * | 9/2006 | Shimakage | 382/104 |
| 7,151,996 B2 | 12/2006 | Stein | |
| 7,362,883 B2 * | 4/2008 | Otsuka et al. | 382/104 |
| 7,876,926 B2 * | 1/2011 | Schwartz et al. | 382/104 |
| 2003/0103649 A1 * | 6/2003 | Shimakage | 382/104 |
| 2006/0239509 A1 * | 10/2006 | Saito | 382/104 |
| 2009/0296987 A1 * | 12/2009 | Kageyama et al. | 382/103 |
| 2010/0014714 A1 * | 1/2010 | Zhang et al. | 382/104 |
| 2010/0054538 A1 * | 3/2010 | Boon | 382/104 |

OTHER PUBLICATIONS

W. Kwon and S. Lee, "Performance Evaluation of Decision Making Strategies for an Embedded Lane Departure Warning System," Journal of Robotic Systems, 19 (10), pp. 499-509, 2002.
D. D. Salvucci, "Inferring Driver Intent: A Case Study in Lane-Change Detection," in Proceedings of the Human Factors Ergonomics Society 48th Annual Meeting, 2004.
J. C. McCall and Mohan Manubhai Trivedi, "Video-Based Lane Estimation and Tracking for Driver Assistance: Survey, Systems, and Evaluation". IEEE Transactions on Intelligent Transportation Systems, 7 (1), pp. 20-37, 2006.
Duda, R. O. and P. E. hart, "Use of the Hough Transformation to Detect Lines and Curves in Pictures", Comm. ACM, vol. 15, pp. 11-15, 1972.

* cited by examiner

*Primary Examiner* — Paul N. Dickson
*Assistant Examiner* — George D. Spisich

(57) ABSTRACT

A method is provided for detecting road-side edges in a road segment using a light-based sensing system. Input range data is captured using the light-based sensing system. An elevation-based road segment is generated based on the captured input range data. The elevation-based road segment is processed by filtering techniques to identify the road segment candidate region and by pattern recognition techniques to determine whether the candidate region is a road segment. The input range data is also projected onto the ground plane for further validation. The line representation of the projected points are identified. The line representation of the candidate regions is compared to a simple road/road-edge model in the top-down view to determine whether the candidate region is a road segment with its edges. The proposed method provides fast processing speeds and reliable detection performance for both road and road-side edges simultaneously in the captured range data.

20 Claims, 5 Drawing Sheets

ROAD-EDGE DETECTION

BACKGROUND OF INVENTION

An embodiment relates generally to road detection by detecting road-side edges in the road.

Road-side edge detection systems are used either to alert a vehicle driver of the presence of road edges in the vehicle driving path, or to provide the feasible driving area limit for route planning in autonomous driving. Typical systems utilize a vision-based system such as a camera to analyze the captured image. Such vision-based systems are susceptible to incorrectly distinguishing road-side edges such as curbs from shadows from trees, buildings, and other environmental conditions. Furthermore, vision based systems are typically challenged by certain situations such sharp curves in the road.

SUMMARY OF INVENTION

An advantage of the invention provides fast processing speeds and reliable detection performance for both road and road-side edges simultaneously in the captured LIDAR range data. The method first selects candidate regions for road and road-side edges based on elevation data and then exams them in the projection on the ground plane to determine the presence and location of road and its road-side edges.

An embodiment contemplates a method of detecting road-side edges in a road segment using a light-based sensing system. Input range data is captured using the light-based sensing system. An elevation-based segment is extracted based on the captured input range data. The elevation-based segment is convolved with a differential filter for generating a filter response for identifying a road segment candidate region. The road segment candidate region includes a plurality of data points that form a candidate road segment, a first road-side edge candidate, and a second road-side edge candidate. A standard deviation of the road segment candidate region is calculated. An objective value for the road segment candidate region is determined as a function of the standard deviation of the road segment candidate region and a number of data points within road segment candidate region. The objective value is compared to a threshold for determining whether the road segment candidate region is a potential road segment. The potential road segment is further examined in the top-down view. A two dimensional representation of the input data is obtained by projecting the input data onto the ground plane. The line segments are identified in the two dimensional representation. The potential region is identified as the detected road with its road-side edges, if the line segments on the side are perpendicular to the middle line segment on the projected ground plane.

An embodiment contemplates a road-side edge detection system that includes a light-based sensing device for capturing input range data. The system further includes a processor for receiving the captured input range data. The processor generates elevation-based road segment data in response to the captured input range data. The processor convolves the elevation-based road segment data with a filter for identifying a road segment candidate region that includes a candidate road segment, a first edge candidate segment, and a second edge candidate segment. The processor determines a weighted standard deviation of the road segment candidate region. The processor calculates an objective value for the road segment candidate region as a function of the weighted standard deviation and a number of data points within the road segment candidate region. The processor compares the objective value to a threshold for determining whether road segment candidate region is a potential road segment. The processor further exams the potential road segment in the top-down view. The processor projects the input data to the ground plane to obtain a two dimensional representation of the input data. The processor finds line segments in the two dimensional representation. The processor identifies the potential region to be the detected road segment with its road-side edges if the potential region has the line segments on the side perpendicular to the middle line segment on the projected ground plane. An output device identifies a location of each of the road-side edges of the road segment.

DETAILED DESCRIPTION

Figure 1:
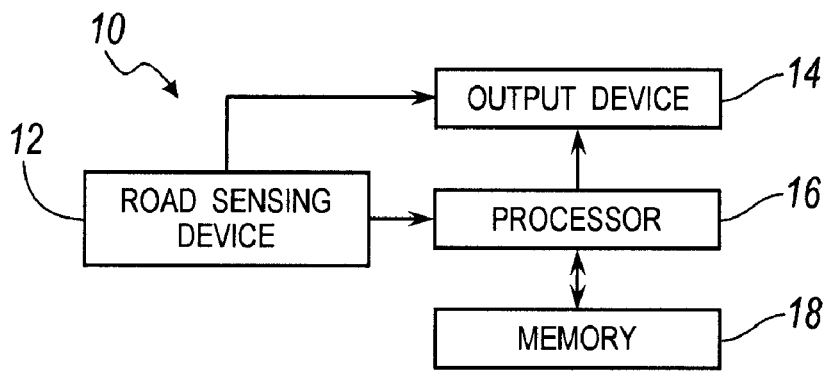
FIG. 1 is a schematic view of a range-based road segment detection system.

There is shown in FIG. 1 a light-based sensing system 10 for detecting road-side edges of a road. The light-based sensing system 10 is used to detect road side edges in the road of the driven vehicle. The light-based sensing system 10 is used in an autonomous steering system for road detection. Alternatively, the light-based sensing system 10 may be used for driver awareness for a vehicle driven by a driver to enhance visibility during the daytime or nighttime when road visibility is poor or during other instances when visibility enhancement is warranted.

The light-based sensing system 10 includes a road sensing device 12 including, but not limited to, a Light Detection and Ranging (LIDAR) optical sensing technology device. The LIDAR device measures the properties of scattered light to determine certain characteristics such as range to a target or other information.

The light-based sensing system 10 further includes a processor 16 for receiving and processing the data captured by the road sensing device 12. A memory storage device 18 may also be provided for storing and retrieving data.

The processor 16 executes a program that filters the captured data for determining the presence and location of the road-side edges. The detected road-side edges are provided to an output device 14 such as an autonomous steering module or an image display device. The autonomous steering module may use the processed information for autonomously maintaining road position within a vehicle road. The image display device which may include, but is not limited to, monitor-type displays, a projection-type imaging, holograph-type imaging, or similar imaging displays may use the processed information for highlighting the road-side edges in the image display device for providing visual enhancement of the road to the driver of the vehicle. The term highlighting refers to identifying the location of the road-side edges or road segments in the image data and may be performed by any comparable method for identifying the location of the road-side edges or road segment in the image data. The detection results also provide the feasible driving area limit for the route planning in autonomous driving.

Figure 2:
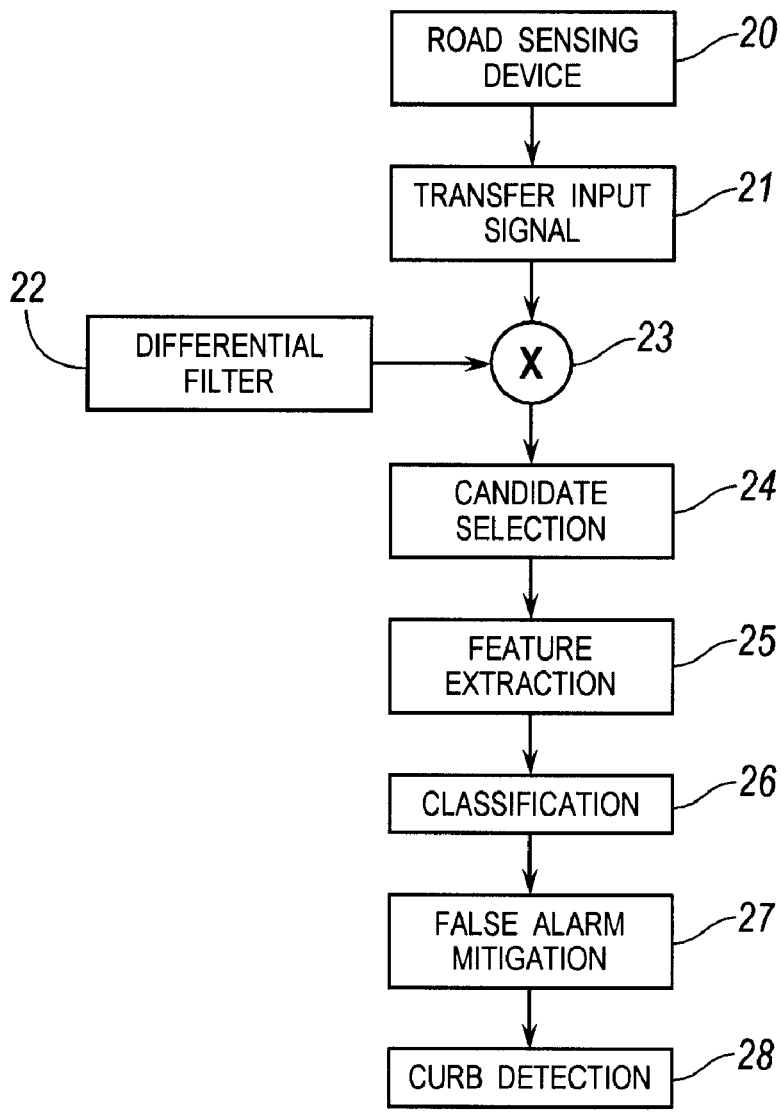
FIG. 2 is a block diagram of a method for detecting a road side edges for a range-based road segment.
Figure 3:
FIG. 3 is a one dimensional view of the captured image.
Figure 4:
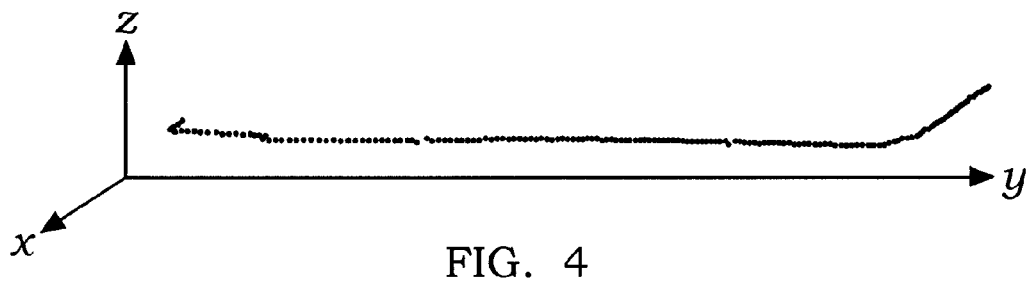
FIG. 4 is a range-based plot of the captured input signal in three-dimensional space.

FIG. 2 illustrates a block diagram for detecting road-side edges from the captured image data. The light-based sensing system 10 is based on the LIDAR optical sensing technology that uses light to determine distance to the target (e.g., the light-based sensing system determines the varying distances in range of the scanned road segment region). In block 20, a LIDAR optical sensing device scans a candidate road segment exterior of the vehicle as an array as illustrated in FIG. 3. The LIDAR optical sensing device selects a scan line and analyzes the scan line for detecting range changes in the scanned road segment region. The LIDAR optical sensing device outputs a signal as a three dimensional point cloud plot as illustrated in FIG. 4.

Figure 5:
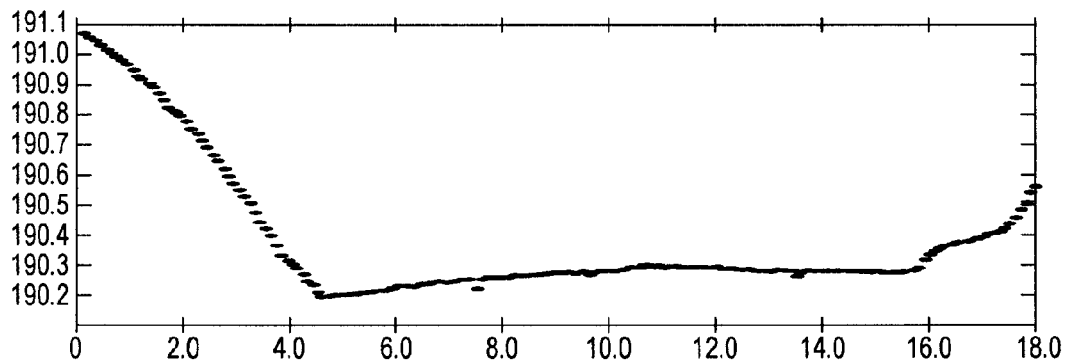
FIG. 5 is a plot of an elevation-based road segment.

In block 21, the elevation of the LIDAR input signal (i.e., one dimensional plot) is provided to the processing unit for processing and detecting potential road-side edges. It is understood that road-side edges may relate to curbs or other changes in the edges of the road which signify a change between the road and off-road terrain. The processor applies a one dimensional road-edge detection algorithm that analyzes elevation changes in the captured input data. That is, the road-edge detection algorithm analyzes only the elevation of the captured road image. An elevation-based road segment signal is generated by the processing unit to enhance the elevation changes in the input plotted signal. An example of the elevation-based road segment is shown in FIG. 5.

Figure 6:
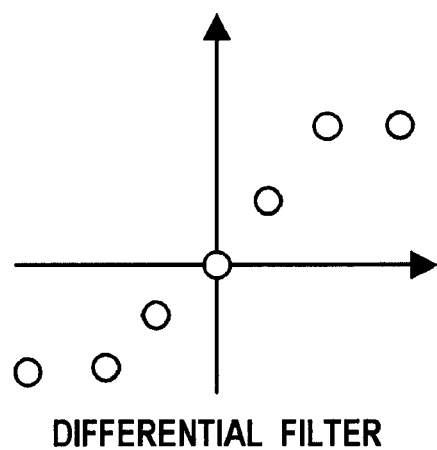
FIG. 6 is a sample of differential filter applied to the elevation-based road segment.
Figure 7:
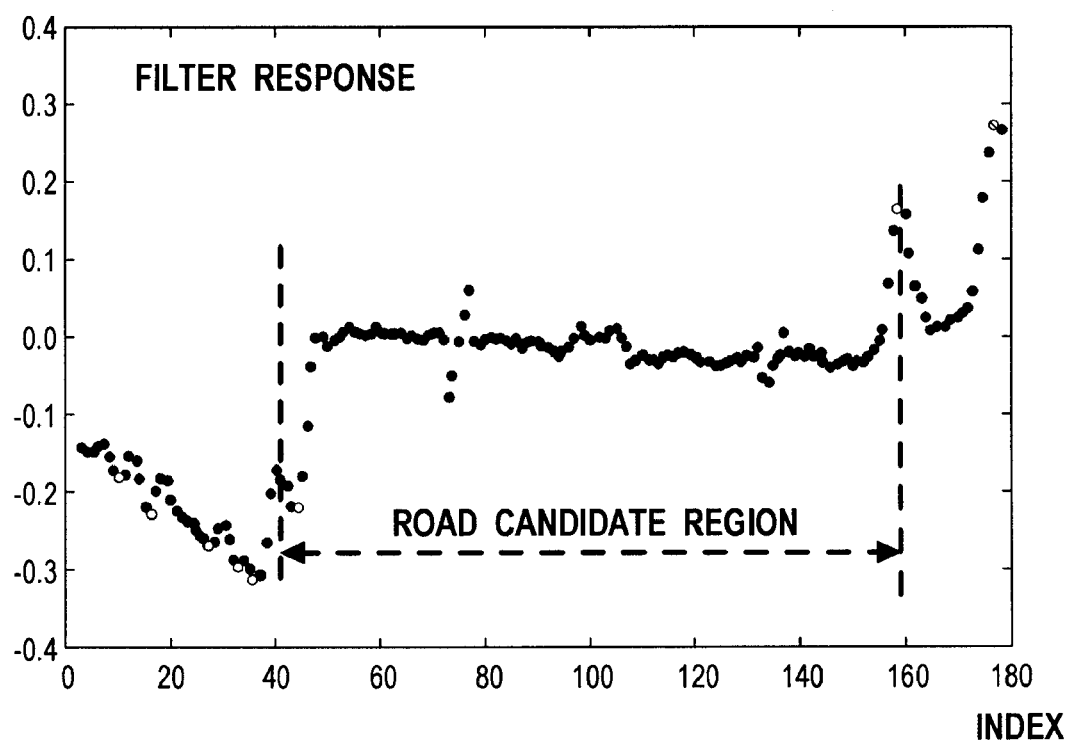
FIG. 7 is a filter response of the elevation-based road segment.

In block 22, a differential filter, shown in FIG. 6, is used to transform the elevation-based road segment signal to distinguish the candidate regions of road-side edges. The differential filter may include, but is not limited to, a Gaussian differential filter that is used to identify positive peaks and negative peaks which are representative of road-edge candidate regions. In block 23, the differential filter is convolved with the elevation-based road segment via the convolution multiplier for outputting a filter response signal. An example of the filter response signal is shown in FIG. 7.

In block 24, a filter response is generated for selecting an elevation-based road segment candidate region that includes a plurality of substantially horizontal data points (e.g., candidate road segment) and a plurality downward shifting and upward shifting data points (e.g., road-side edges). A first road-side edge candidate represented by a local negative peak in the filter response is identified at an abrupt shifting downward of the data points in the filtered response in comparison to substantially horizontal data points juxtaposed to the downward shifting points. A second road-side edge candidate represented by a local positive peak in the filter response is identified at an abrupt shifting upward of data points in the filtered response in comparison to the substantially horizontal data points juxtaposed to the upward shifting data points. It is required that a peak response magnitude of these respective responses be higher than a predetermined peak threshold to distinguish from any noise. The respective region between the negative peak and the positive peak is a candidate for a road segment as illustrated in FIG. 7.

In block 25, a feature extraction is applied to the elevation-based road segment candidate region. The variance of the ground elevation is used as the feature to be extracted. This is performed by determining a weighted standard deviation of the road segment candidate region. The formula for determining the weighted standard deviation is represented by:

$$\sigma_{(w)} = \sqrt{\frac{\sum_{i=1}^{N} w_i(x_i - \bar{x})^2}{\frac{(N-1)\sum_{i=1}^{N} w_i}{N}}}$$

where $\sigma_{(w)}$ is the weighted standard deviation, $w_i$ is the determined weight, $x_i$ is a respective value of a set of values, $\bar{x}$ is a weighted mean of all the values $x_i$ in the set of values, and N is the number of values. The determined weight for weighting the standard deviation $w_i$ is determined by using the following formula:

$$w(i) = \begin{cases} 2*\arcsin(i*\pi/(N-1)), & 2*\arcsin(i*\pi/(N-1)) \leq 1 \\ 1, & \text{otherwise} \end{cases},$$

$$i = 0, 1, 2, \ldots, N-1,$$

where N is the number of data points in a respective road segment candidate region.

In block 26, a classifier is provided for selecting balancing parameters that are used in a formula for determining whether the road segment candidate region is a potential road segment. The classifier may include any classifier includes, but is not limited to, support vector machine and neural network training program. Balancing parameters selected by a trained classifier provide a balance between the weighted standard deviation of the road segment candidate region $\sigma_{(w)}$ and the number the total number of points within the road segment candidate region N. The balancing parameters are used to calculate an objective value which is used to determine whether the road segment candidate region is a road segment. The formula for determining the objective value f is represented by the following formula:

$$f = \alpha * \sigma_w + \gamma/N$$

where $\sigma_{(w)}$ is the weighted standard deviation of the road segment candidate region, $\alpha$ is a balancing parameter applied to the weighted standard deviation, N is the number of values in the road segment candidate region, and $\gamma$ is the balancing parameter applied to the number of values. The balancing parameters are selected for balancing the weighted standard deviation and the number of values in the road segment candidate region.

The determined objective value f is compared to a predetermined threshold value for determining whether the road segment candidate region is a road segment. If the objective value is smaller than the predetermined threshold, then the determination is made that the road segment candidate region is a road segment. If the objective value is larger than the predetermined threshold, then the road segment candidate region is considered not to be the road segment.

In block 27, a false alarm mitigation test is applied for verifying that the road segment candidate region is the road segment. The width of the road segment is represented by a distance (d). The distance (d) is compared to a predetermined distance. The predetermined distance is a minimum distance that is required for the system to verify the presumption that the road candidate segment region between the respective road-side edges is a road. If the distance (d) is greater than the predetermined distance, then the road segment candidate region is considered to be a road segment. If the distance (d) is less than the predetermined distance, then the road segment candidate region is considered not to be the road segment.

Figure 8:
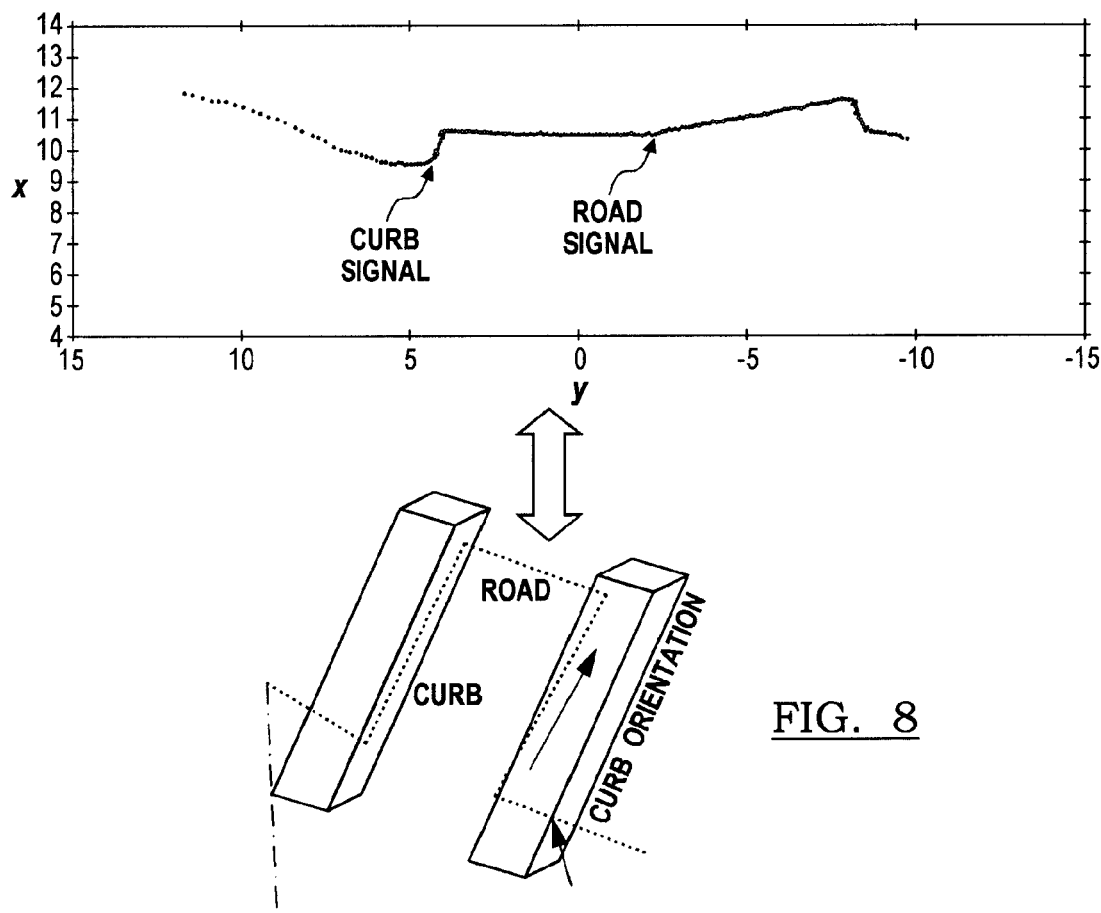
FIG. 8 is a top view of a ground plane projection of the input range data.

In block 28, the input range data is also projected on the ground plane for further examination using curb detection in top-down view as shown in FIG. 8. The points intersecting the road edges/curbs form multiple lines. Since the sensor scans the scene surface with a small pitch-down angle to ensure a look-ahead distance, the road edge/curb lines are perpendicular to the road surface on the projected ground plane. The candidate region is identified as the detected road with its road-side edges, if the line segments on the side are perpendicular to the middle line segment on the projected ground plane.

Figure 9:
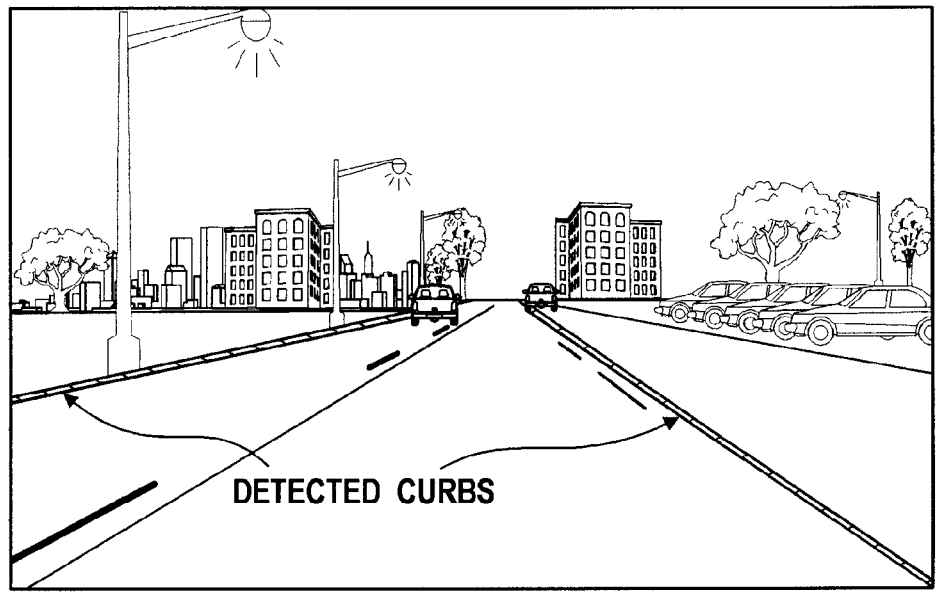
FIG. 9 is a display of highlighted roadside edges of the captured image.

The road-side edge detection is applied to an output device. The output device as described earlier may include, but is not limited to, the autonomous steering module or the imaging display device. The autonomous steering module uses the detected road-side edges for autonomously maintaining the vehicle between the road-side edges. The imaging display device highlights the detected road-side edges for visually enhancing the road segment to the driver of the vehicle as shown in FIG. 9. As stated earlier, highlighting refers to identifying the location of either the road-side edges or road segment in the image data and may be performed by any comparable method for showing the location of the road-side edges or road segment in the image data.

Figure 10:
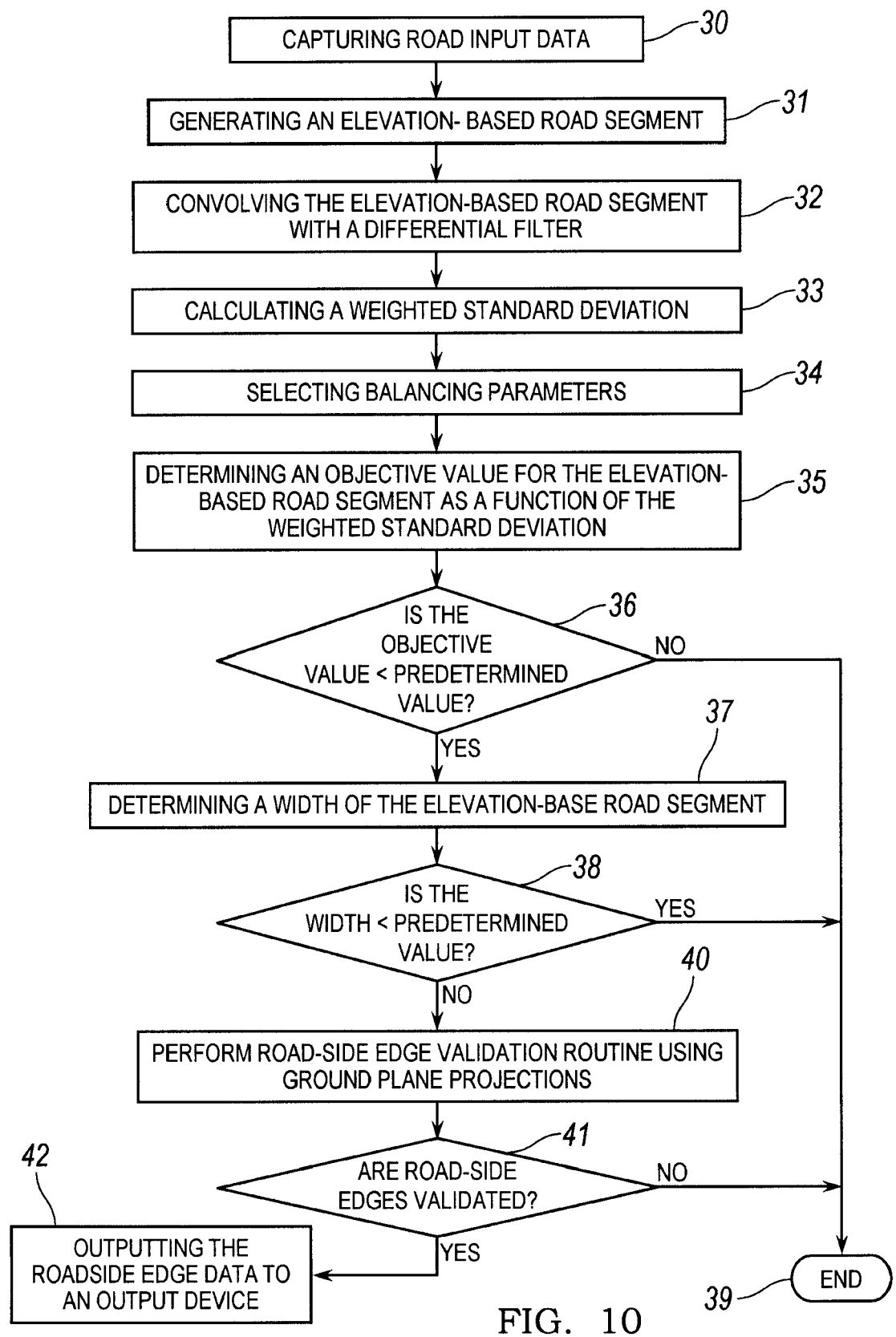
FIG. 10 is a flowchart of a method for detecting road-side edges in a road segment.

FIG. 10 is a flowchart of a method for detecting a road segment. In step 30, road input data is captured by a road sensing device that includes, but is not limited to, a LIDAR based sensing device. In step 31, the elevation-based road segment is generated in response to the captured input road data.

In step 32, the elevation-based road segment is convolved with a differential filter for generating a filter response signal. The filter response signal enhances respective road-side edge candidates.

In step 33, a weighted standard deviation is determined for the elevation-based road segment. In step, 34, respective balancing parameters are selected for providing a balance between the standard deviation and the number of data points in the elevation-based road segment.

In step 35, an objective value is determined for the elevation-based road segment as a function of the weighted standard deviation, a respective balancing parameter applied to the weighted standard deviation, a number of data points within the elevation-based road segment, and a respective balancing parameter applied to the number of data points.

In step 36, the objective value is compared to a predetermined threshold. If the objective value is greater than the predetermined threshold, then the determination is made that the elevation-based road segment is not a road segment and the routine is terminated in step 39. If the determination is made that the objective value is less than the predetermined threshold, then the determination is made that the elevation-based road segment may be a road segment and the routine proceeds to step 37.

In step 37, a width of the elevation-based road segment is determined. In step 38, the width is compared to a predetermined distance threshold. If the width is less than the predetermined distance threshold, then the routine proceeds to step 39 where the routine is terminated. If the width is greater than the predetermined distance, then the routine proceeds to step 40.

In step 40, road-side edges of the road segment are further validated using curb detection in top-down view by projecting the input data to the ground plane (as shown in FIG. 8). Multiple lines are identified in the top-down view using Hough transform. The angle $\theta$ between the middle segment and the side segments are calculated.

The system described herein detects the road and road-side edges together to improve the processing speed and robustness. Since it is assumed that the road contains a flat surface in the middle and two sharp elevation changes (road-side edges) on the side, the system identifies candidate regions with a flat surface in the middle and sharp elevation changes on the side in elevation. The range data is also projected onto the ground plane for further examination. The line representation of the projected points is extracted. Since the LIDAR data scans the scene surface with a small pitch-down angle to ensure a look-ahead distance, the road edge lines are perpendicular to the road surface on the projected ground plane. Therefore, the candidate region with the line segments on the side perpendicular to the middle line segment on the projected ground plane is identified as the detected road with its road-side edges.

In step 41, determination is made whether the first and second road-side edges are substantially perpendicular to the candidate road segment. The term substantially perpendicular as used herein refers to the two segments being within a predetermined threshold of 90 degrees. This step is accomplished by determining whether the absolute value of $|\theta-90|$ for either side segment is smaller than predetermined threshold. If the absolute value is smaller than the predetermined threshold, then the candidate segment is validated as a road segment with road-side edges and the routine proceeds to step 42; otherwise, the routine proceeds to step 39 where the routine is terminated.

In step 42, the detected road-side edge data of the road segment are provided to an output device. The output device may include, but is not limited to, an autonomous steering module for autonomously steering the vehicle within the detected road-side edges or an image display device for visually enhancing the location of the road segment to the driver of the vehicle.

While certain embodiments of the present invention have been described in detail, those familiar with the art to which this invention relates will recognize various alternative designs and embodiments for practicing the invention as defined by the following claims.

What is claimed is:

1. A method of detecting road-side edges in a road segment using a light-based sensing system, the method comprising the steps of:
  capturing input range data using the light-based sensing system;
  generating an elevation-based road segment based on the captured input range data;
  convolving the elevation-based road segment with a differential filter for generating a filter response for identifying a road segment candidate region, the road segment candidate region including a plurality of data points that form a candidate road segment, a first road-side edge candidate, and a second road-side edge candidate;
  calculating a standard deviation of the plurality of data points forming the road segment candidate region;
  determining an objective value for the road segment candidate region as a function of the standard deviation of the road segment candidate region and a number of data points within road segment candidate region; and
  comparing the objective value to a threshold for determining whether the road segment candidate region is a road segment.

2. The method of claim 1 further comprising the step of applying a false alarm mitigation analysis for verifying whether the road segment candidate region is the road segment, the false alarm mitigation analysis further comprises the steps of:
　　determining a distance between the first road-side edge candidate and the second road-side edge candidate;
　　comparing the distance to a predetermined distance; and
　　determining that the road segment candidate region is the road segment in response to the distance being greater than the predetermined distance, otherwise determining that the road segment candidate region is not the road segment.

3. The method of claim 1 wherein the first road-side edge candidate is identified by a negative peak in the filter response and the second road-side edge candidate is identified by a positive peak in the filter response.

4. The method of claim 3 wherein the filtered response includes a plurality of substantially horizontal data points and a plurality downward shifting data points, and wherein the negative peak is identified at an abrupt shifting downward of data points in the filtered response in comparison to substantially horizontal data points juxtaposed to the downward shifting data points.

5. The method of claim 4 wherein the filtered response includes a plurality of substantially horizontal data points and a plurality of upward shifting data points, and wherein the positive peak is identified at an abrupt shifting upward of data points in the filtered response in comparison to the substantially horizontal data points juxtaposed to the upward shifting data points.

6. The method of claim 1 wherein the step of determining a standard deviation includes calculating a weighted standard deviation of the road segment candidate region.

7. The method of claim 1 further comprising the step of performing a road-side edge validation routine for verifying that the candidate road-side edges are road-side edges, the road-side edge validation routine further comprising the steps of:
　　projecting the input range data onto a ground plane;
　　determining whether the first road-side edge candidate and the second road-side edge candidate are substantially perpendicular to the candidate road segment; and
　　validating the first road-side candidate edge and the second candidate road-side edge as road-side edges in response to the first road-side candidate edge and the second candidate road-side edge being substantially perpendicular to the candidate road segment.

8. The method of claim 1 wherein determining the objective value (f) is derived from the following formula:

$$f = \alpha * \sigma_Z + \gamma/N$$

where $\sigma_Z$ is the weighted standard deviation of the road segment candidate region, $\alpha$ is a balancing parameter applied to the weighted standard deviation of the road segment candidate region, N is the number of data points within the road segment candidate region, and $\gamma$ is a balancing parameter applied to the number of data points (N) within the road segment candidate region.

9. The method of claim 8 wherein the respective balancing parameters are determined by a classifier.

10. The method of claim 9 wherein the respective balancing parameters are determined by a support vector machine classifier.

11. The method of claim 9 wherein the respective balancing parameters are determined by a neural network-base training program.

12. The method of claim 8 wherein the respective balancing parameters are selected to provide a balance between the weighted standard deviation and the number of data points for a road segment candidate region.

13. The method of claim 1 wherein the road segment is provided to an autonomous steering system for providing locations of the road-side edges for maintaining road position.

14. The method of claim 1 wherein the road segment is provided to an image display device for providing the location of the road-side edges in an image display device.

15. A road-side edge detection system comprising:
　　a light-based sensing device for capturing range input data;
　　a processor for receiving the captured range input data, the processor generating elevation-based road segment data in response to the captured road input data, the processor convolving the elevation-based road segment data with a filter for identifying a road segment candidate region that contains a plurality of data points that form a candidate road segment, a first edge candidate segment, and a second edge candidate segment, the processor determining a weighted standard deviation of the plurality of data points forming the elevation-based road segment candidate region, the processor calculating an objective value for the road segment candidate region as a function of the weighted standard deviation and a number of data points within the road segment candidate region, the processor comparing the objective value to a threshold for determining whether a road segment candidate region is a road segment; and
　　an output device identifying a location of each of the road-side edges of the road segment.

16. The road-side edge detection system of claim 15 further comprising a false alarm mitigation module for verifying whether a road segment candidate region is a road segment wherein a distance determined between the first edge candidate region and the second edge candidate region is compared to a predetermined distance, and wherein the segment is determined to be the road segment if the distance is greater than the predetermined distance, otherwise determining that the region is not the road segment.

17. The road-side edge detection system of claim 15 further comprising a classifier for generating the weighting parameters.

18. The road-side edge detection system of claim 17 wherein the classifier is a support vector machine classifier.

19. The road-side edge detection system of claim 17 wherein the classifier is a neural network training program.

20. The road-side edge detection system of claim 15 wherein the light-based sensing device includes a LIDAR sensing device.

* * * * *